June 4, 1968  E. E. ROSS ETAL  3,386,560
METHOD AND APPARATUS FOR ORIENTING ELONGATED
TAPERED AGRICULTURAL PRODUCTS
Filed April 6, 1967  5 Sheets-Sheet 1
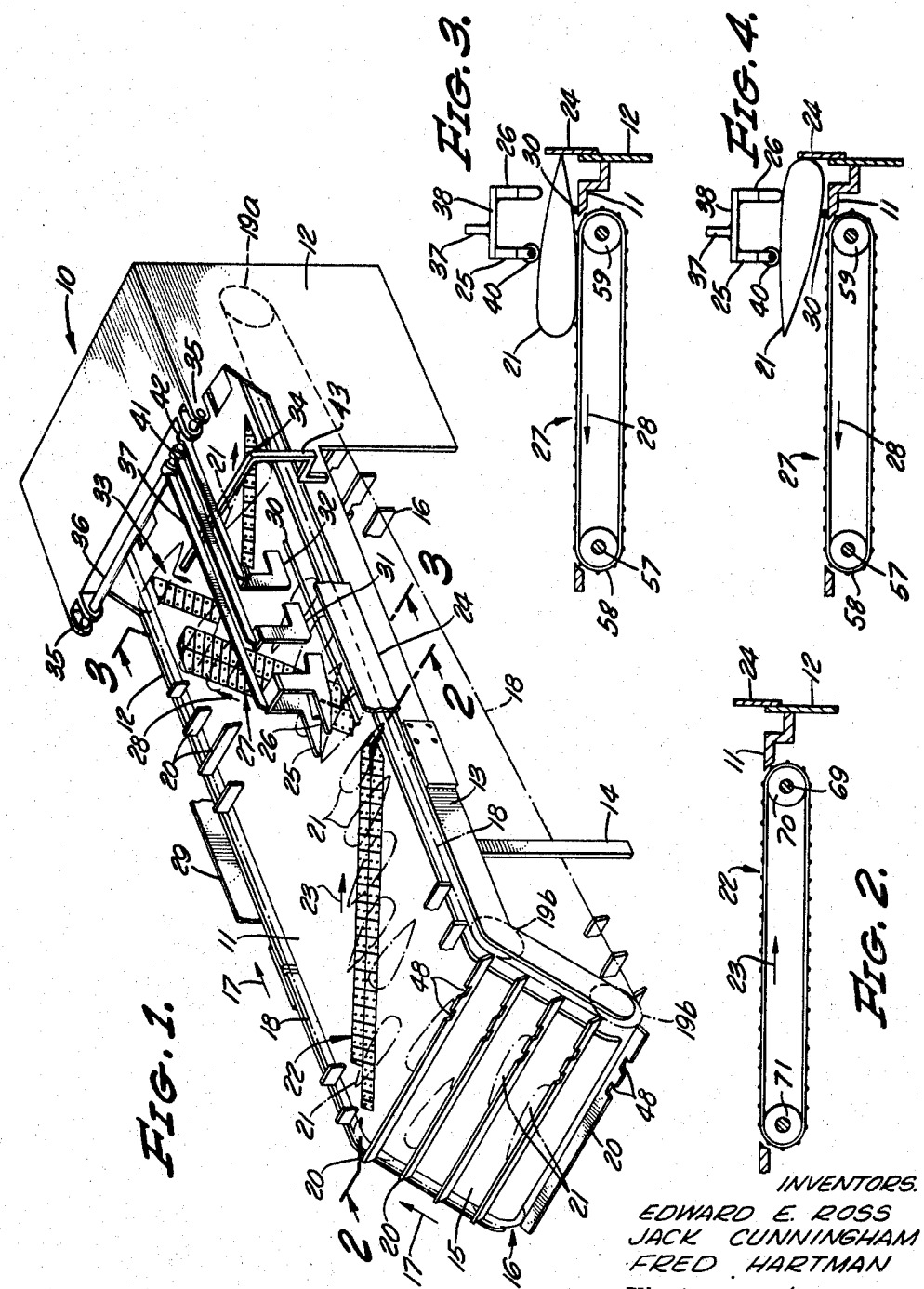
INVENTORS.
EDWARD E. ROSS
JACK CUNNINGHAM
FRED HARTMAN
BY Flehr, Hohbach, Test,
Albritton & Herbert
ATTORNEYS June 4, 1968

E. E. ROSS ETAL 3,386,560

METHOD AND APPARATUS FOR ORIENTING ELONGATED
TAPERED AGRICULTURAL PRODUCTS

Filed April 6, 1967

INVENTORS.
EDWARD E. ROSS
JACK CUNNINGHAM
FRED HARTMAN

BY

ATTORNEYS

INVENTORS.
EDWARD E. ROSS
JACK CUNNINGHAM
FRED HARTMAN

BY Flehr, Hohbach, Test,
Albritton & Herbert
ATTORNEYS

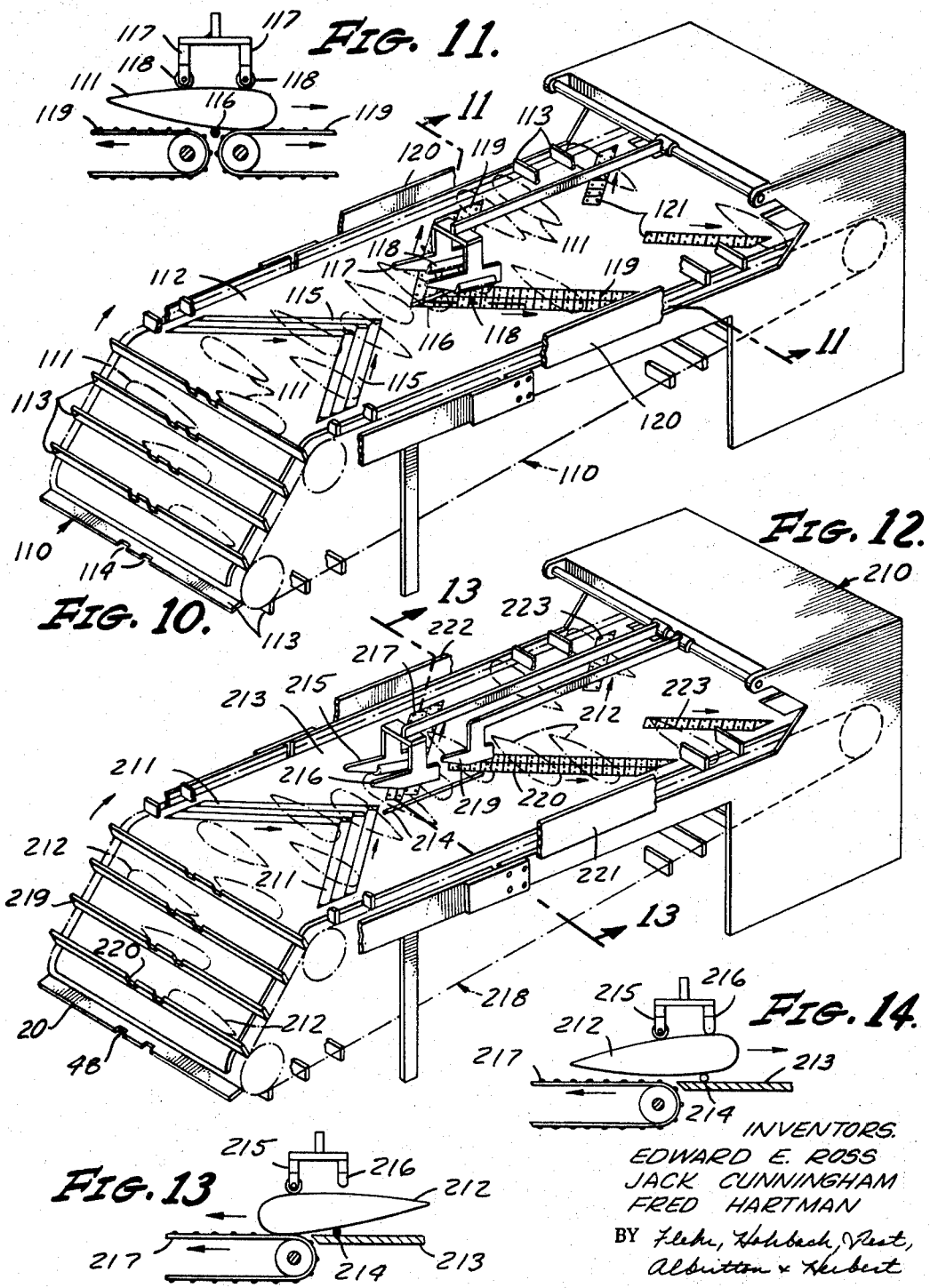

INVENTORS.
EDWARD E. ROSS
JACK CUNNINGHAM
FRED HARTMAN
BY
ATTORNEYS

United States Patent Office 3,386,560
Patented June 4, 1968

3,386,560
METHOD AND APPARATUS FOR ORIENTING ELONGATED TAPERED AGRICULTURAL PRODUCTS
Edward E. Ross, Lafayette, Calif., Jack Cunningham, Pittsburgh, Pa., and Fred Hartman, Toppenish, Wash., assignors to California Packing Corporation, San Francisco, Calif., a corporation of New York
Filed Apr. 6, 1967, Ser. No. 628,973
40 Claims. (Cl. 198—31)

ABSTRACT OF THE DISCLOSURE

Method and Apparatus for orienting elongated tapered agricultural products (e.g., unhusked corn). The products are moved one after the other through a sensing region where sensing means detects their orientation. Depending upon their orientation the products are separated into two groups, each having the largest diameter ends of the products pointing in the same direction.

---

This invention is related to the processing of agricultural products and is more particularly related to a method and apparatus for orienting elongated tapered agricultural products such as corn, carrots, turnips, parsnips and the like. This application is a continuation of part of our copending application Ser. No. 394,486, filed Sept. 4, 1964 now abandoned, for "Method and Apparatus for Orienting Tapered Agricultural Products."

Present day machinery used in processing agricultural products like corn ears commonly performs the steps of husking and cutting automatically. One of the problems encountered in the use of such automatic machinery is how to feed the products into these machines so as to properly execute the subsequent operations. For example, in husking green corn, the ears must be aligned for the butt cutting operation prior to husking. It has been the practice in the past to hand-feed the ears into the butt cutting machine. Such a method consumes considerable time and labor and, in addition, presents a safety hazard to the operator.

It is an object of the present invention to provide an improved method and apparatus for orienting elongated tapered agricultural products. It is a more specific object of the present invention to provide a method and apparatus for continuously orienting a plurality of tapered agricultural products with their large diameter ends facing in a desired direction.

Another object of this invention is to provide a method and apparatus wherein tapered agricultural products are caused to become oriented by a series of feed chains running diagonally across a feed table, and wherein presser feet are employed to detect differences in the dimensions of each article.

Another object of the invention is to provide a novel method and apparatus for sensing the orientation of such products and to effect the separation of the products into two groups in accordance with such sensing.

Another object of the invention is to provide a novel method and apparatus for the segregation of the products into two groups in cooperation with the sensing means. In this connection, one form of the invention makes use of conveying means which engage the largest diameter ends of the products while they are being acted upon by the sensing means.

Additional objects and features of the invention will appear from the following description in which the preferred embodiments of the invention have been disclosed in detail in conjunction with the accompanying drawing.

In carrying out the present invention, elongated tapered agricultural products, such as unhusked ears of corn, are moved or conveyed one behind the other through a sensing region or station where the products are sensed to determine their orientation (i.e., whether their largest diameter ends point in one direction or in the opposite direction). Depending upon the orientation, products of at least one orientation are engaged and moved away from the products that are in the other orientation. The apparatus of our invention includes novel sensing means and means for presenting the products one after the other to the sensing means. Also means is provided to effect automatic separation between the two groups of products, in cooperation with the sensing means.

Referring to the drawing:

FIGURE 1 is a diagrammatic perspective view, partially in section, of a preferred embodiment of the present invention;

FIGURE 2 is a diagrammatic partial sectional view taken along the line 2—2 of FIGURE 1;

FIGURE 3 is a diagrammatic partial sectional view taken along the line 3—3 of FIGURE 1;

FIGURE 4 is another diagrammatic sectional view similar to FIGURE 3 showing an ear of corn in a different position;

FIGURE 10 is a diagrammatic perspective view of another embodiment of the invention using belt units for centering the products, in conjunction with the sensing means;

FIGURE 11 is a diagrammatic partial side elevation taken along the line 11—11 of FIGURE 10;

FIGURE 12 is a diagrammatic perspective view of a modification of the orienting unit shown in FIGURE 10 in which the diagonally running V belts in the orientor unit are staggered to improve the separation function;

FIGURE 13 is a diagrammatic sectional view taken through line 13—13 of FIGURE 12 showing the operation for an ear of corn having the large end oriented to the left;

FIGURE 14 is a diagrammatic partial side view similar to FIGURE 13 showing the operation of the orientor when the large end of an ear of corn is oriented to the right;

Figure 5:
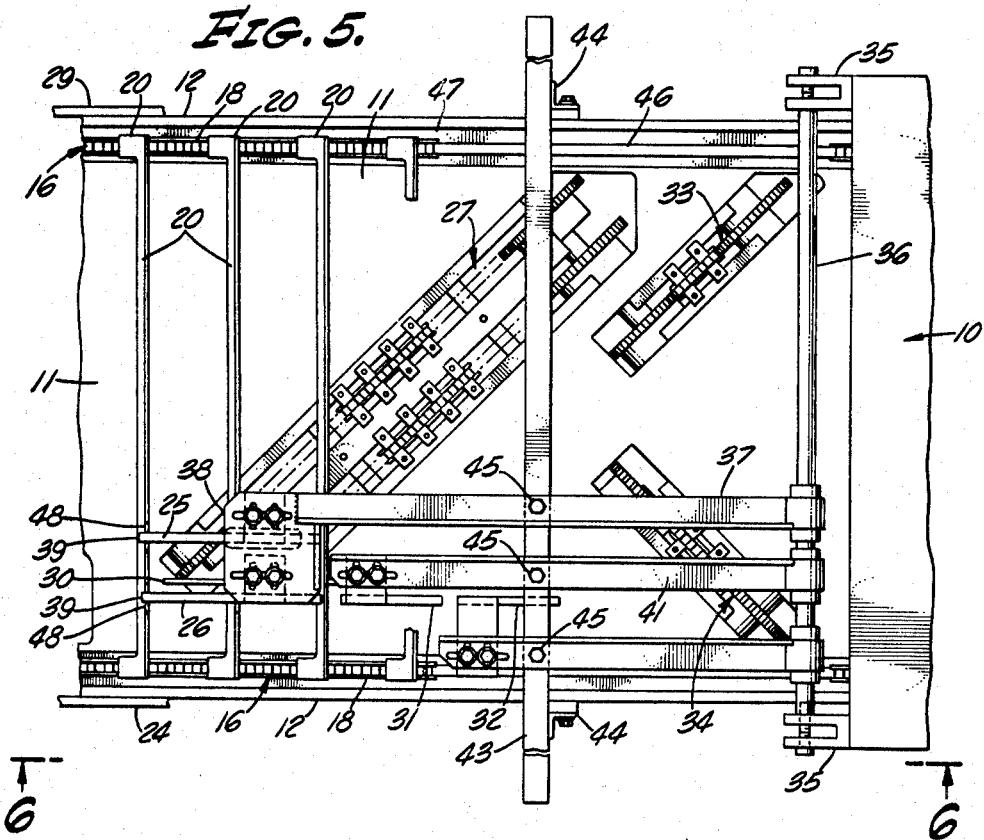
FIGURE 5 is a diagrammatic partial plan view of the apparatus shown in FIGURE 1, showing the relationship of the pressers and the take-away chains.
Figure 6:
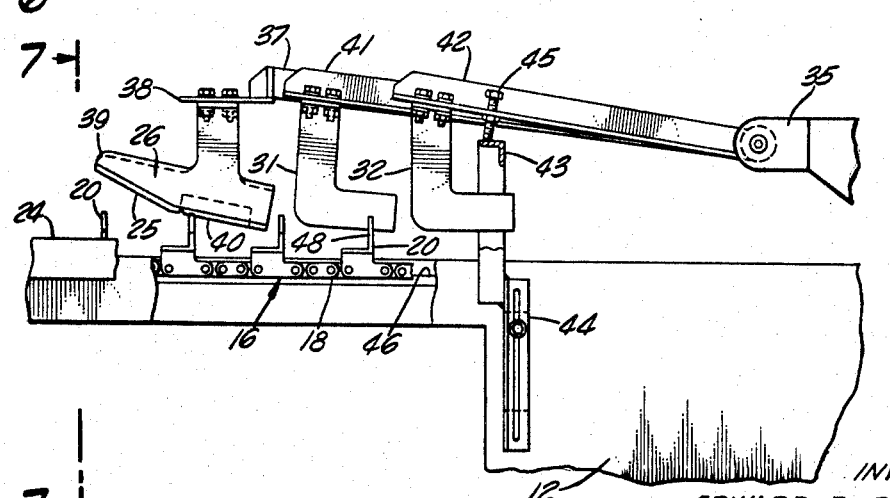
FIGURE 6 is a diagrammatic partial side view taken along line 6—6 of FIGURE 5 showing the presser feet assembly.

Referring now to FIGURE 1, there is shown a first embodiment of the apparatus of the present invention. A butt cutter generally designated 10 is shown with an enlarged feed table 11, supported by the side panels 12 to which have been added the extensions 13 and extension supports 14 to support the enlarged feed table 11. The delivery section 15 of feed table 11 is inclined with respect to the horizontal feed table. A flighted conveyer generally designated 16 moves up the delivery section 15 and across the feed table 11 in the direction of the arrows 17. Conveyer 16 consists of a chain 18 driven over suitable sprockets 19, shown diagrammatically herein. Conveyer chain 18 carries a series of flights 20 consisting of flat bars extended laterally across the feed table which cause the agricultural products to move up the delivery section 15 and across the feed table 11 as desired. The conveyer 16 in conjunction with the upwardly faced working surface provided by table 11 may be referred to as the main conveying means.

Ears of corn 21 are delivered at the delivery section 15 and carried on to the feed table 11 by the flighted conveyer 16, one ear per flight. The ears are delivered to the conveyer 16 in a usual manner and are picked up at random. As the ears 21 move onto feed table 11 they will each encounter the diagonally running centering chain 22 which will move the ears sideways in the direction of arrow 23 against the stop 24. FIGURE 2 shows a sectional side view of the centering chain 22 which moves in the direction 23 to transfer the ears of corn diagonally across feed table 11 against the stop 24. The specific apparatus used on chain 22 will be better described in connection with FIGURES 8 and 9.

Upon encountering the stop 24, and continuing their forward motion, the ears of corn 21 are conveyed to a sensing region or station where sensing means is provided. In the form illustrated this means includes the presser feet 25 and 26. The position of these presser feet and the distance separating them from one another is so adjusted that when either end of an ear of corn is against the stop 24, the largest diameter end of the ear will be adjacent the nearest presser foot. Upon reaching the presser feet 25 and 26, the largest diameter of ear 21 will support one or the other of these feet depending upon the orientation of the ear. Referring now to FIGURE 3, for an ear having its butt end facing to the left, the large diameter will come in contact with the presser foot 25 which in turn will force the ear 21 downward on the left side where it will come in contact with take-away means which may be in the form of a take-away conveyer chain 27. Take-away chain 27 is driven in the direction indicated by the arrow 28 and for ears which come in contact with it, chain 27 will cause the ears to move diagonally across the table to the left until the butt end thereof encounters the stop 29.

In FIGURE 4, an ear of corn 21 is shown with its butt end oriented to the right against the stop 24. In this case, the largest diameter of the ear 21 will be adjacent the presser foot 26. Fulcrum means is provided which engages each ear in a region between the regions engaged by the presser feet 25 and 26. The fulcrum means engages the ears while they are being acted upon by the sensing means, and in this embodiment is in the form of a rod or wire 30. When the large diameter end of the ear is contacted by presser foot 26, it will be pressed down on fulcrum forming means such as the hold wire 30. The wire 30 is positioned between the presser feet 25 and 26 but somewhat closer to foot 26. The pressure supplied by foot 26 will cause the ear 21 to tilt or pivot about the wire 30 thereby lifting the small end up and away from the take-away chain 27 while the flights 20 carry the ear forward. Preferably additional presser feet 31 and 32 are added in alignment with presser foot 26 to ensure that ears oriented to the right will be carried straight forward by gripping the large end and holding it against the hold wire 30, preventing the ear from being pulled backward by the take-away chain 27. A sufficient number of presser feet 31, 32 are provided to ensure that the ear will be carried forward until it clears take-away chain 27. It will be evident that as the products are conveyed one directly behind the other to the sensing region where the sensing means is located, one side of each product is coincident with a common area formed by the surface of table 11.

Without the wire 30, orienting action can occur with proper vertical relationship between the level of the upper engaging surface of conveyer 27 and the level of the upper surface of table 11. However, use of the fulcrum forming wire 30 improves the range of product shapes that can be handled with proper orientation.

A pair of secondary orienting conveyer chains 33 and 34 may be provided farther forward on the feed table 11 near the entrance to the butt cutting machine 10. Orienting chain 33 runs parallel to take-away chain 27 and assures that if chain 27 is not effective in bringing an ear completely against the stop 29, the ear will be moved against that stop by chain 33 before entering the butt cutting machine 10. Likewise, orienting chain 34 operates to move the ears which do not come in complete contact with the stop 24, to a position in contact with the stop whereby they will enter the butt cutting machine 10 in the proper position.

FIGURE 5 shows a top view of the feed table showing the relationship of the presser feet to the various feed chains. The flighted delivery conveyor 16 consisting of the roller chain 18 and flights 20 moves across the feed table 11 from left to right. Butt cutting machine 10 is provided with a pair of brackets 35 supporting a transverse rod 36 to which are pivotally mounted the various presser arms. Presser arm 37 supports, by means of bracket 38, the presser feet 25 and 26. The presser feet 25 and 26 are rigidly affixed to the bracket 38 and each has an upwardly inclined toe 39 to allow the free entry of ears 21 under the pressers. Presser foot 25 is provided with a roller 40 having its axis parallel to the line of travel of the delivery on the feed table. Roller 40 permits the take-away chain 27 to move an ear 21 diagonally across the table and out from under the presser foot. Presser feet 26, 31 and 32 are all skid pressers, and by having no rollers, prohibit lateral movement of the ears, thereby keeping them in line on the wire 30. Presser feet 31 and 32 are each L-shaped shoes substantially aligned with the presser foot 26. Presser foot 31 is attached to a presser arm 41 pivotally mounted on rod 36. Likewise, presser foot 32 is mounted to presser arm 42 pivotally mounted on rod 36. A height adjusting stop bar 43 is extended across the table 11 at a height sufficient to clear the ears 21 and the flights 20. Stop bar 43 is supported by a suitable adjustable bracket 44 mounted to the side members 12. Each of the presser arms 37, 41 and 42 is provided with a stop adjusting means 45 which contacts the stop bar 43 to allow adjustment of the minimum height of each individual presser foot above the feed table. With the arrangement just described the presser feet are yieldably urged toward the table and toward limiting positions determined by the stop adjusting means 45.

The flighted delivery chains 18 travel on rails 46 formed in channels 47 on each side of the feed table 11 and are driven by the drive sprockets 19a over idler sprockets 19b.

Figure 7:
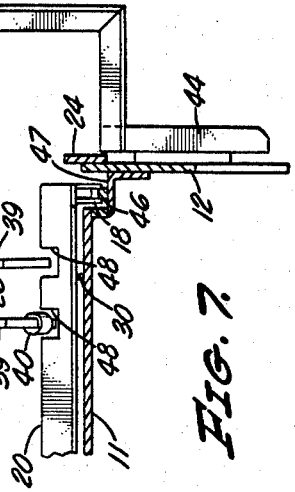
FIGURE 7 is a diagrammatic partial end view taken along line 7—7 of FIGURE 6 showing a front view of the presser feet assembly.

Each of the flights 20 has notches 48 cut therein to allow free passage under the presser feet 25 and 26, as may best be seen in FIGURE 7. The presser feet must come close enough to the table 11 to contact the ears 21, and yet, the flights 20 must be high enough to move the ears along efficiently. In addition, flights 20 are raised above table 11 to clear the wire 30 and to prevent stoppages caused by flagleaves and tassels catching between the flights and the table. If additional numbers of pressers are required, additional notches must be provided in flights 20.

Figure 8:
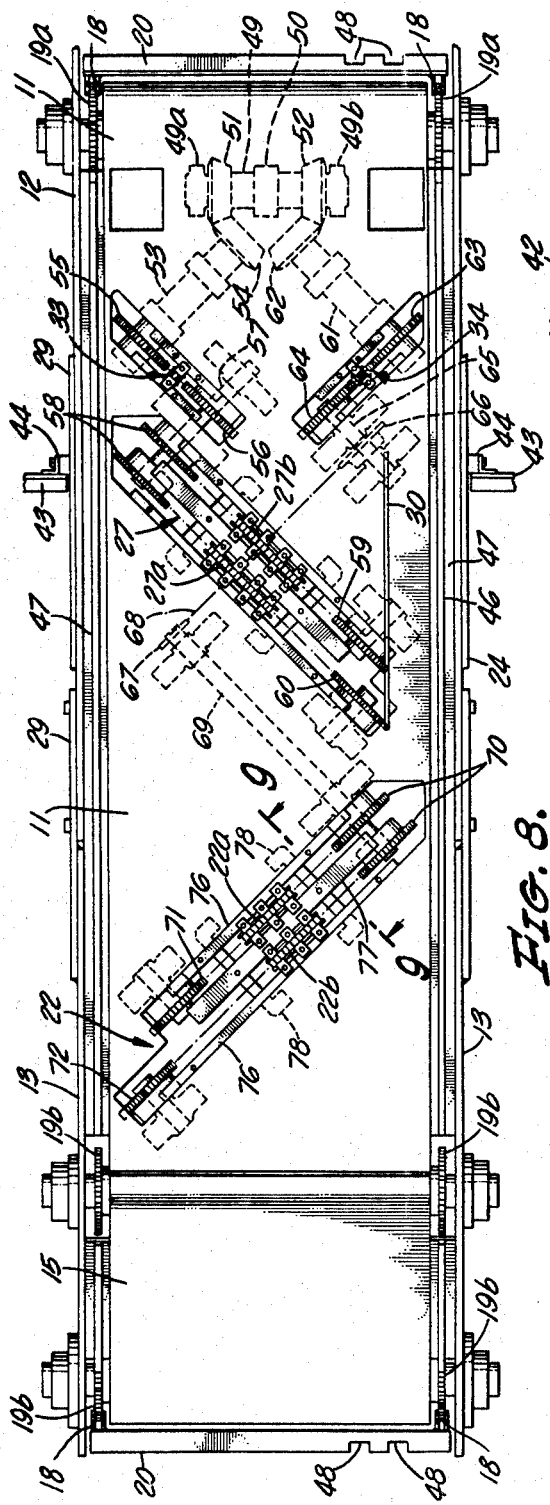
FIGURE 8 is a diagrammatic plan view of the feed table showing the details of the row forming and orienting conveyer chains and the drive mechanism therefor.
Figure 9:
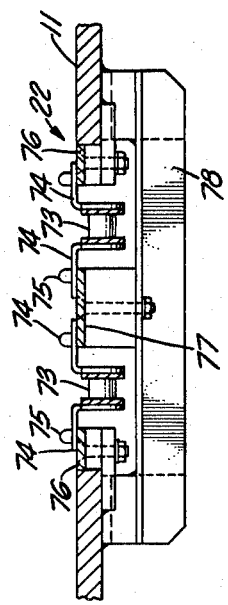
FIGURE 9 is a diagrammatic partial sectional view taken along line 9—9 of FIGURE 8 showing the detail of a typical feed chain.

The details of the drive mechanism and the drive train can best be seen in FIGURES 8 and 9. FIGURE 8 shows a plan view of the feed table 11 with the pressers removed and the butt cutting device not shown. That portion of the drive train which is beneath table 11 is shown in dotted lines. A first drive shaft 49 supported at each end by suitable bearings 49a and 49b, contains a central drive gear 50 which is the point at which power is applied to the entire drive train. Shaft 49 contains two bevel gears 51 and 52, each of which in turn drives a separate series of diagonal drive chains.

Bevel gear 51 drives shaft 53 through a second bevel gear 54 attached at one end. The other end of shaft 53 has a chain sprocket 55 mounted thereon which drives the secondary orienting chain 33. Chain 33 in turn drives the idler sprocket 56 connected to shaft 57, which in turn drives dual sprockets 58 driving the take-away chain 27. Take-away chain 27 can consist of two chains 27a and 27b of different length which in turn drive idler sprockets 59 and 60 located near the wire 30. Two chains are used for the take-away chain 27 to assure an efficient take-away operation, but in order to conserve parts in the running gear a single drive shaft 57 is used. This results in one chain 27b being shorter than the other chain 27a.

From the other side of the first drive shaft 49, the bevel gear 52 drives a shaft 61 through bevel gear 62, and shaft 61 is connected to a drive sprocket 63 which in turn drives the secondary orienting chain 34. Chain 34 in turn drives the idler sprocket 64 which is connected through shaft 65 to a connecting sprocket 66. Sprocket 66 drives sprocket 67 by means of a connecting chain or belt 68 shown in phantom line in FIGURE 8. Sprocket 67 is connected to shaft 69 which in turn drives dual sprockets 70, driving the two centering chains 22a and 22b which pass over idler sprockets 71 and 72. By means of the described drive train, it will be seen that there are three conveyor chains running diagonally to the right side of the feed table and three chains running diagonally toward the left side of the feed table. Without the use of motion reversing transmissions, all drive chains required to move to the right are driven to the right, and the same is true for those chains moving to the left.

The details of a suitable conveyor chain used herein is best shown in FIGURE 9. For each conveyor chain, a diagonal slot is cut in the table 11. Such a slot is shown in section in FIGURE 9. While FIGURE 9 shows a double chain such as that used at 22, it will be noted that a single chain such as that used at 34 is of similar design.

It would not be desirable to have the chain 73 actually come in contact with the produce since the chain is ordinarily lubricated. To eliminate this, a standard roller chain 73 is provided at alternate links with lateral fairings 74 which extend above chain 73 and to which are riveted the lugs 75. The fairings 74 travel on the lateral wear strips 76, and, in the case of the double chains, there is also provided a central wearing strip 77, supported under the feed table 11 by a U-shaped bracket 78. The rounded lugs 75 are very effective in causing the ears to move diagonally across the feed table 11.

Although the above-described apparatus represents one preferred form of apparatus for orienting tapered agricultural products, there are a number of modified forms of the invention which operate efficiently. FIGURES 10 and 11 show another modification of the apparatus using a combination of the principles heretofore set forth. Those portions of the apparatus which are similar to those previously described will not be repeated herein but only those modifications which are distinct.

FIGURE 10 shows a flighted delivery conveyor 110 which delivers ears of corn 111 to the feed table 112. Each flight 113 is notchd at 114 to provide clearance for the centrally positioned presser feet. Upon reaching the feed table 112, the ears 111 first encounter a series of converging counter-rotating belts 115 that are arranged in the form of a V. These belts operate to position the center of gravity of the ears 111 along the center line of the table 112. The flights 113 then operate to move the ears forward along the table until they encounter fulcrum means 116 in the form of a roller, and pass under the presser feet 117. Both of the presser feet 117 are provided with rollers 118 which will permit the take-away chain 119 to move the ears out laterally from the center of the feed table 112 until the butt of each ear contacts the stop 120. A secondary set of orienting conveyor chains 121 may be provided, if desired, to further improve the orientation.

FIGURE 11 shows the operation of this embodiment. As the ear of corn 111 moves under the dual and rigidly connected presser feet 117, the largest diameter of the ear 111 is contacted first by one of the pressers 117, pivoting the ear about the fulcrum means 116, and pressing the ear down on to one of the take-away chains 119 which moves the ear of corn outward in the direction of the largest end. The small end of the ear will not be pulled out by the opposite take-away chain because the fulcrum means 116 holds the small end up above the opposite outward moving chain 119.

FIGURE 12 shows another form of the present invention utilizing features shown both in FIGURES 1 and 10. In this case, the ears of corn are again converged toward the center by counter-rotating disposed V belts 211. When each ear of corn 212 has been positioned with its center of gravity near the center of the feed table 213, it encounters the fulcrum wire 214 which projects above the upper surface of feed table 213. At the same time the ear passes under two rigidly connected presser feet 215 and 216. Presser foot 215 is of the roller type previously described whereas presser foot 216 is of the skid type. Hold wire 214 is situated slightly to one side of center but between presser feet 215 and 216. Beginning approximately at center is the first take-away conveyer chain unit 217 which is situated on the same side of the feed table as the roller presser 215. As is shown in FIGURE 13, for an ear of corn 212 oriented with its large end on the same side of center as the roller presser 215, the roller presser 215 comes in contact with the large diameter end of the ear pivoting it about fulcrum wire 214 and pressing it downward onto the take-away chain 217, thus causing the ear to be moved in the direction pointed by its largest end.

In FIGURE 14 an ear of corn oriented with its large end to the right is shown wherein the skid presser 216 will come in contact with the largest diameter of the ear holding the small tip of the ear up and away from the take-away chain 217. Presser 216 will keep the end of ear 212 up and away from chain 217 until the flighted conveyer 218 moves the ear past the chain 217. An additional skid presser 219 is provided to ensure that the small end of ear 212 does not fall down on take-away chain 217. Conveyer 218, with its flights 219 having slots 220, corresponds to conveyer 110 and slotted flights 113 of FIGURE 10. When the flighted conveyer 218 moves the ear past the end of fulcrum 214, the ear will be released whereupon it will come in contact with take-away chain 220 which moves the ear diagonally to the right in the direction of the butt end of the ear 212, until it comes in contact with the stop 221. Take-away chain 217 moves the ears over to the left until the butt end comes in contact with the stop 222. As previously stated a secondary set of conveyor chains 223 may be provided if desired. The staggering of the take-away conveyor chains 217 and 220 represents an improvement over the device shown in FIGURE 10 in that the separation of the ears is more efficient particularly in instances where the diameter differential is not so great.

Figure 15:
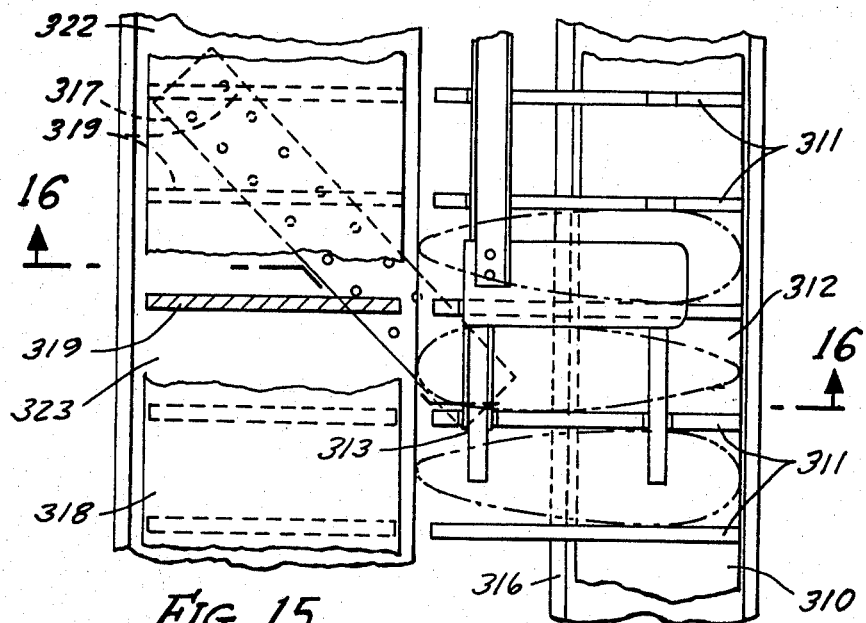
FIGURE 15 is a diagrammatic plan view showing another embodiment of the invention.
Figure 16:
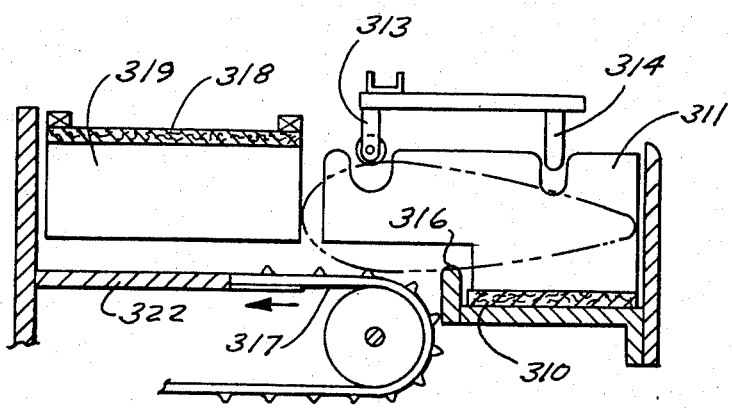
FIGURE 16 is a diagrammatic cross section of FIGURE 15 taken along the line 16—16 of FIGURE 15.

FIGURES 15 and 16 illustrate a simplified embodiment in which the products are moved through the sensing region by conveying means having pockets in which the products are disposed. Thus an endless conveyer belt 310 is provided with parallel flights 311 to form pockets 312 in which the ears are disposed. It is assumed that the ears are placed in the pockets by manual or suitable mechanical means (not shown) without regard to orientation. The presser feet 313 and 314 are provided at the sensing station. A fulcrum forming bar or ridge 316 extends along one edge of the belt 310 and engages the lower sides of the ears in a region between the presser feet.

When presser foot 313 engages the largest end of an ear, this end is pressed downwardly against one portion of the take-away conveyer 317, whereby the ear is moved to the left as viewed in FIGURES 15 and 16. Suitable means can be provided for receiving the ears so acted upon by conveyer 317. For example, a conveyer belt 318 may be provided with inverted flights 319, with the same spacing as flights 311 and moving over the upper surface of table 322. Suitable drive means (not shown) serves to drive the belts 310 and 318 at the same speed. Thus when an ear is moved by conveyer 317 it is received in an adjacent aligned pocket 323 between the flights 319.

Figure 17:
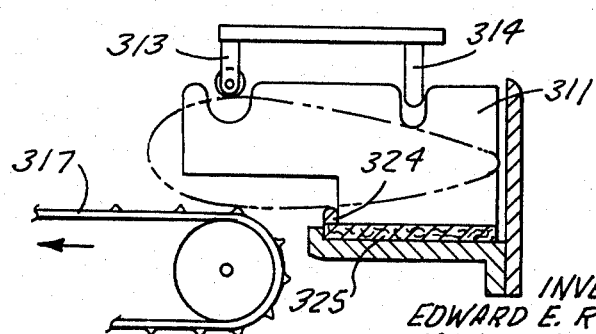
FIGURE 17 is a diagrammatic detail in section showing a modification of FIGURES 15 and 16.

FIGURE 17 is a modification of FIGURES 15 and 16. The fulcrum forming ridge 324 in this instance is a part of the conveyer belt 325 and therefore moves with the ears.

While particular embodiments of the present invention have been shown and described in conjunction with corn, it will be obvious to those skilled in the art that the apparatus and method can be modified to accommodate any tapered agricultural product without departing from this invention in its broader aspects and it is the aim in the appended claims to cover all such changes and modifications as fall within the true scope and spirit of this invention.

We claim:

1. In a method for orienting ears of corn comprising moving the ears one behind the other toward a sensing region with the longtudinal axes of the ears extending laterally of the direction of movement and substantially parallel to each other but without endwise orientation whereby some of the ears have an orientation in which their largest diameter ends are pointing in one direction and the remainder have another orientation in which their largest diameter ends are pointing in an opposite direction, sensing the endwise orientation of the ears in said sensing region while the ears are being so conveyed, said sensing being by determining which of two axially spaced portions is of greatest diameter and in accordance with such sensing engaging and moving the ears of one of said orientations out of and away from the sensing region and from the ears of the other orientation, and restraining each ear during the last named movement to maintain its axis generally parallel to the axis of the ears in the sensing region.

2. A method as in claim 1 in which sensing of the orientation is carried out by contacting the largest diameter ends only of the conveyed ears in said sensing region and thereby determining the endwise orientation of the same, such contact in each instance being discontinued after initial movement of the ear out of the sensing region.

3. A method as in claim 2 in which pressure is applied to the largest diameter ends that are contacted in the sensing operation, the pressure being applied essentially in a direction lateral to the axis of the ears and from one side thereof, and in which the ears of said one orientation are moved away by engaging the largest diameter ends of the ears on the opposite side of the same, and employing the aforesaid pressure to facilitate said last-mentioned engagement, said pressure being removed when said sensing contact is discontinued.

4. A method as in claim 3 in which the products in the other orientation are tilted to elevate their smallest diameter ends during movement through said sensing region.

5. In a method for orienting elongated and tapered agricultural products comprising moving a row of the products with their longitudinal axes extending laterally of the direction of movement and substantially parallel to each other but without endwise orientation whereby some of the products have an orientation in which their largest diameter ends are pointed in one direction and the remainder have an orientation in which their largest diameter ends are pointing in an opposite direction, tilting the products about a fulcrum axis located intermediate the ends of the products while pressing upon the largest diameter ends of the products, and then causing the products that are tilted in one direction to be moved away from the other products.

6. A method as in claim 5 in which the products that are tilted in said one direction are moved away by engagement with their largest ends.

7. In a method for orienting elongated tapered agricultural products comprising moving said products toward a sensing region, with the longitudinal axes of the products extending laterally of the direction of movement and substantially parallel to each other but without endwise orientation whereby some of the products have an orientation in which their largest diameter ends are pointing in one direction and the remainder have an orientation in which their largest diameter ends are pointing in an opposite direction, causing at least some of said products to be moved in the direction of their axes but without regard to their orientation to arrange all of the products in a row before the products are moved to the sensing region, sensing the endwise orientation of each of the products in said sensing region, engaging and moving the products of one of said orientations away from said region and from the products of the other orientation, and causing the products of said one orientation to be arranged in another row.

8. A method as in claim 7 in which the sensing of the orientation is carried out by contacting the largest diameter ends of the conveyed products in the sensing region and thereby determining the endwise orientation of the same.

9. A method as in claim 7 in which the products are tilted about a fulcrum axis intermediate their ends during said sensing.

10. In a method for orienting tapered agricultural products, placing each of said products on an upwardly faced surface with the largest diameter ends of some of said products pointed in a first direction and the largest diameter ends of the remainder of said products pointed in the opposite direction, moving the products over said surface in a direction lateral to their axes and with their axes parallel, aligning said products in a first moving row on said surface, causing the products of said first row to be successively moved into a sensing region, sensing in said region the direction in which the largest diameter end of each of said products is pointing, and in accordance with such sensing moving said products having their largest diameter ends pointed in said first direction away from said region and said first row and forming them in a second row whereby the largest diameter ends of said products in said second row are all oriented in said first direction and the largest diameter ends of said remainder of said products remaining in the first row are all oriented in said second section.

11. In a method of orienting elongated tapered agricultural products comprising sequentially delivering each of said products to the upwardly faced surface of a feed table, conveying said products across said table in a direction parallel to the longitudinal dimension of said table and with their axes generally parallel and transverse to the direction of converging movement, moving said products into a column along one side of said table, sensing the largest diameter of each of said products while in said column, retaining in position each product having its largest diameter end adjacent the aforesaid side of said table, and moving each of said products having its largest diameter end oriented away from said side across said table at an angle to said longitudinal dimension of said table whereby each said product is moved largest diameter end first to the opposite side of said table.

12. A method as in claim 11 in which the products are tilted relative to each other during said sensing operation.

13. In apparatus for orienting elongated and tapered agricultural products comprising means for moving said products one behind the other in one direction toward a sensing region with the longitudinal axes of the products substantially parallel and extending laterally of the direction of movement of the main conveying means but without endwise orientation whereby some of the products have an orientation in which their largest diameter ends are pointed in one direction and the remainder a second orientation in which their largest diameter ends are pointed in an opposite direction, sensing means at the sensing region for sensing the orientation of the objects being so conveyed, and additional means coacting with said sensing means for moving the products of one orientation away from the sensing means and from the products that are in the other orientation.

14. Apparatus as in claim 13 in which the sensing means includes means disposed to contact the largest diameter ends of the products in said one orientation.

15. Apparatus as in claim 13 together with means for engaging said products to move the same into a single row, one behind the other, before said products are moved to the sensing region.

16. In apparatus for orienting elongated and tapered agricultural products comprising means for moving said products in a row one behind the other toward a sensing region with the longitudinal axes of the products substantially parallel and extending laterally of the direction of movement but without endwise orientation whereby some of the products have an orientation in which their largest diameter ends are pointed in one direction and the remainder have another orientation in which their largest diameter ends are pointed in an opposite direction, means in the sensing region for sensing the orientation of the products and for applying pressure to the largest diameter ends of the products in one of said orientations while the products are being so moved, and additional means for engaging and moving the products of said one orientation in the direction pointed by the largest diameter ends of the same, said last named movement being in a direction to move the products in said one orientation away from the products that are in the other orientation, said additional means being a conveyer having a portion of the same so disposed that the pressure applied to products by said sensing means acts to urge the products against said portion.

17. Apparatus as in claim 16 together with means for tilting the products in the other one of said orientations as they are moved through the sensing region, the tilting serving to elevate the smallest diameter ends of the products to prevent their engagement with said portion of the additional moving means.

18. Apparatus as in claim 17 in which said tilting means includes means forming a fulcrum disposed to engage said products intermediate their ends and extending in the direction of movement of the first named moving means, and presser means for applying pressure to the largest diameter ends of the products in the other one of said orientations as the products move through said sensing region, said pressure serving to effect tilting of the products about the axis formed by said fulcrum means.

19. Apparatus as in claim 17 in which the sensing means includes spaced members disposed to engage and press against the largest diameter ends of the products in said sensing region, the engagement being on that side of the row opposite to the fulcrum forming means.

20. In apparatus for orienting elongated and tapered agricultural products comprising a main conveying means for conveying said products in a row one behind the other with the longitudinal axes of the products substantially parallel and extending laterally of the direction of movement of the main conveying means but without endwise orientation whereby some of the products have an orientation in which their largest diameter ends are pointed in one direction and the remainder have an orientation in which their largest diameter ends are pointed in an opposite direction, pressure means having two laterally spaced portions disposed to engage and press against the largest diameter ends of the products in both said orientations as the products are being conveyed in a row by said main conveying means, said portions being yieldably urged toward pressing engagement with the said largest diameter ends of the products, take-away conveying means disposed to engage the largest diameter ends of the products in one of said orientations while such largest diameter ends are engaged by one of the portions of said presser means, said take-away conveying means serving to move the products of said one orientation away from the products in the other orientation, fulcrum forming means disposed to engage the products in both said orientations between the ends thereof while the products are engaged by said presser means, said fulcrum forming means in conjunction with said presser means functioning to tilt the products in the sensing region whereby the smallest diameter ends of the tilted products in said other orientation are moved to prevent effective engagement with said take-away conveying means and the largest diameter ends of the products in said one orientation are urged into effective engagement with said take-away conveying means.

21. Apparatus as in claim 20 in which the take-away conveying means consists of a conveyer which extends at an angle to the direction of movement of the aforesaid row of products, the feed end of such conveyer being located to engage the largest diameter ends of products in said one orientation while such ends are engaged by said sensing means.

22. Apparatus as in claim 21 together with means for moving the products into a row one behind the other before engagement with the presser means.

23. In apparatus for orienting elongated tapered agricultural products comprising a working surface, means for individually delivering each of said products to said surface with the largest diameter ends of some of said products pointed in a first direction and the largest diameter ends of the remainder of said products pointed in the opposite direction, means for aligning said products in a first row on said surface, means for sensing the direction in which the largest diameter end of each of said products is pointing while in said row, and conveying means coacting with the sensing means for moving said products having their largest diameter ends pointed in said first direction away from said first row to one side of said surface to form said products into a second row on said surface whereby the largest diameter ends of said products in said second row are all oriented in said first direction and the largest diameter ends of the remainder of said products are all oriented in said second direction.

24. The apparatus of claim 23 wherein further conveying means are provided for moving said remainder of said products away from said first row to the other side of said surface to form said remainder of said products into a third row, all of said products in said third row having their largest diameter ends oriented in said second direction.

25. Apparatus as in claim 23 in which the sensing means includes means for pressing upon the largest diameter ends of the products to urge the same in a direction toward the working surface.

26. In apparatus for orienting elongated tapered products comprising means forming a fulcrum, a sensing means spaced from the fulcrum, means for moving the products along a path between the fulcrum and the sensing means with one side of the product intermediate its ends engaging the fulcrum and the opposite side engaging the sensing means, the sensing means including portions engaging the largest diameter ends of the products thereby causing the products to be tilted about the axis of the fulcrum in accordance with the orientation of the products, and means responsive to such tilting for moving products of one orientation away from the other products.

27. Apparatus as in claim 26 in which said last named means moves the products in the direction pointed by their largest diameter ends.

28. Apparatus for orienting elongated tapered agricultural products comprising a feed table having an upwardly faced surface, a flighted conveyer for continually moving said products along said surface, means operative to converge said products into a desired alignment, said converging means comprising one or more endless belts mounted upon said feed table, each said endless belt having a surface thereon in substantially the same plane as the horizontal surface of said feed table, each said endless belt running at an angle to the longitudinal dimension of said feed table, means for detecting the diameter differential of each said product, and means coacting with the detecting means to separate said products from the aforesaid alignment to a position in which their largest diameter ends are outermost along the edges of said feed table.

29. Apparatus for orienting elongated tapered agricultural products comprising a feed table having an upwardly faced surface, a flighted conveyer for delivering said products to said surface, said conveyer continuously moving said products along said surface, conveying means operative to converge said products into a first row, means for detecting the diameter differential of each said product in said first row, and conveying means cooperating with said sensing means for moving said products away from said first column in the direction of their largest diameter ends to form second and third columns along the edges of said feed table, all of the products in each of said second and third columns having their largest diameter ends pointing outwardly.

30. In apparatus for orienting tapered agricultural products, means for moving said products while in alignment one behind the other, the products extending laterally of the direction of movement, means for detecting the diameter differential of each said products while in said alignment, said detecting means comprising at least two presser feet rigidly connected together and spaced from the working surface to contact the larger diameter end of each said products, fulcrum forming means disposed intermediate said presser feet and spaced therefrom whereby the products move between the presser feet and the fulcrum forming means with tilting about the fulcrum forming means, at least one of said presser feet having a roller mounted thereon with its axis parallel to the direction of movements of the conveying means to facilitate lateral movement of said products from beneath the same, and additional conveying means coacting with the detecting means to move said products from the aforesaid alignment to a position out of such alignment and in the direction pointed by their largest diameter ends, a portion of the last named conveying means being disposed to engage the largest diameter end of a product while such product is engaged by said roller.

31. In apparatus for orienting elongated tapered agricultural products, conveying means for continually moving said products in alignment one behind the other, means for sensing the diameter differential of each said product while in said alignment, said sensing means comprising at least two presser feet rigidly connected together and positioned in a sensing region to contact the larger diameter ends of each said products while in said alignment, fulcrum forming means intermediate said presser feet, the conveying means serving to move the products between the fulcrum means and the presser feet with the products being tilted in one direction or the other depending upon their endwise orientation, at least one of said presser feet having a roller mounted thereon on an axis parallel to the direction of movement of the conveying means to facilitate lateral movement of said products from beneath the same, and conveying means coacting with said sensing means and operative to move products from the aforesaid alignment in the direction pointed by their largest diameter ends, said last named conveying means comprising at least one endless belt driven diagonally with respect to the direction of movement of the conveyer and having one portion of the same disposed to engage the largest diameter ends of products while such ends are engaged by said roller.

32. An apparatus as in claim 31 wherein the last named means comprises a number of endless roller chains, each of said chains having a plurality of lateral fairings mounted thereon, said fairings extending above the said chains, each fairing provided with an upward projecting lug, said chains driven over sprockets mounted below the level of said upwardly faced surface, said surface being provided with a number of diagonal slots positioned above said chain and chain sprockets, lateral wear strips fitted along the edges of said slots, said lateral fairings adapted to ride along said wear strips whereby said lugs project above said surface of said feed table, and drive means for said chain sprockets.

33. Apparatus for orienting elongated tapered agricultural products comprising means forming a working surface, a conveyer for continually moving said products along said surface, means operative to converge said products into alignment one behind the other, means for detecting the diameter differential of each said product while in said alignment, said detecting means comprising two presser feet rigidly attached together and positioned at a height above said table sufficient to contact the larger diameter end of each said product in said alignment, a fulcrum forming member mounted on said feed table between said presser feet, said member projecting beyond the working surface and forming a fulcrum for said products, one of said presser feet having a roller mounted on the lower portion thereof, said roller being mounted on an axis parallel to the direction of movement of the conveyer, the second presser foot being a skid, said fulcrum forming member being positioned intermediate said presser feet, one or more additional skid pressers aligned with said second presser foot, and means coacting with the detecting means to move products having their largest diameter ends pointing in one direction from the other products.

34. Apparatus for orienting elongated tapered agricultural products comprising means forming a working surface, a conveyer for continually moving said products along said surface, means operative to converge said products into alignment one behind the other, means for detecting the diameter differential of each said product while in said ailgnment, said detecting means comprising two presser feet rigidly attached together, said presser feet being disposed in spaced relationship with the working surface sufficient to contact the larger diameter end of each said product, a fulcrum forming member mounted on said feed table between said presser feet, said member projecting behind the working surface and forming a fulcrum for said products, one of said presser feet having a roller mounted on the lower portion thereof, said roller being mounted on an axis parallel to the direction of movement of the conveyer, the second presser foot being a skid, one or more additional skid pressers aligned with said second presser foot, and separating means coacting with the detecting means to move products having their largest diameter ends pointing in one direction from the other products.

35. In apparatus for orienting elongated tapered agricultural products comprising a table having an upwardly faced working surface, said surface having first and second ends and parallel side edges, means for conveying said products over the working surface, said means including spaced parallel flights extending laterally across the working surface and moving from the first end of the working surface to the second end thereof, each space between two adjacent flights being adapted to receive a product supplied thereto at the first end of the working surface, sensing means disposed intermediate the ends of the working surface, second conveying means disposed between said first end of the working surface and the sensing means, said second conveying means engaging products during movement of the same between the first end of the working surface and the sensing means and acting to align the products in a row before they reach the region of the sensing means, said sensing means serving to sense the location of the largest diameter ends of the products in said row, and third conveying means coacting with the sensing means to engage the largest diameter ends of the products in said row that are pointing in one direction and to move such engaged products away from the other products and toward one side edge of the working surface.

36. Apparatus as in claim 35 in which the sensing means is located adjacent the other side edge of the working surface.

37. Apparatus as in claim 35 in which the sensing means is located substantially midway between the side edges of the working surface and the third conveying means engages the largest diameter ends of all of the products in said row and moves said products in the directions pointed by their largest diameter ends to one or the other of the side edges of the working surface.

38. Apparatus as in claim 35 in which the sensing means includes presser feet disposed to engage the largest diameter ends of the products in said row, and fulcrum means disposed to engage the products in said row intermediate their ends and in opposition to the presser feet whereby the products are tilted in a direction depending upon their endwise orientation.

39. Apparatus as in claim 38 in which one of the presser feet is provided with a roller disposed with its axis parallel with the direction of the movement of the first named conveying means.

40. Apparatus as in claim 16 in which the means for moving the products in a row comprises conveying means forming a moving surface underlying the products and also forming spaces in which the individual products are accommodated, together with fulcrum forming means extending along one longitudinal extending edge of the moving surface and disposed to engage the products intermediate their ends whereby the products are tilted about the axis formed by the fulcrum means by the action of the sensing means.

References Cited

FOREIGN PATENTS 343,864   2/1960   Switzerland.

RICHARD E. AEGERTER, *Primary Examiner.*